(12) United States Patent
Chang et al.

(10) Patent No.: US 8,473,105 B2
(45) Date of Patent: Jun. 25, 2013

(54) FEEDBACK CONTROL METHOD AND DEVICE USING THE SAME

(75) Inventors: Chia-Chi Chang, Hsinchu (TW); Tzu-Chien Hsiao, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 382 days.

(21) Appl. No.: 12/897,191

(22) Filed: Oct. 4, 2010

(65) Prior Publication Data
US 2011/0270422 A1 Nov. 3, 2011

(30) Foreign Application Priority Data
Apr. 30, 2010 (TW) ................................ 99113809 A

(51) Int. Cl.
*G05B 13/00* (2006.01)
(52) U.S. Cl.
USPC ............... 700/275; 700/31; 700/45; 700/299; 700/301
(58) Field of Classification Search
USPC .................... 700/29–31, 45, 275, 299–301
See application file for complete search history.

(56) References Cited

U.S. PATENT DOCUMENTS

| 6,643,628 | B1 * | 11/2003 | Jackson et al. | 706/25 |
| 7,331,184 | B2 | 2/2008 | Lee | |
| 7,549,707 | B2 | 6/2009 | Brennan et al. | |
| 2005/0267606 | A1 * | 12/2005 | Bartlett et al. | 700/29 |
| 2010/0318239 | A1 * | 12/2010 | Oexman et al. | 700/301 |

FOREIGN PATENT DOCUMENTS
WO  WO 2009/102361  *  8/2009

* cited by examiner

*Primary Examiner* — Sean Shechtman
(74) *Attorney, Agent, or Firm* — Morris Manning & Martin LLP; Tim Tingkang Xia, Esq.

(57) ABSTRACT

The present invention provides a method for feedback control and a device using the same, wherein the device comprising a sensing layer for generating a plurality of sensing signals with respect to the at least one kind of characteristics on the sensing layer, and a driving layer for changing the surface status of the sensing layer. The control method is started a step of acquiring the plurality of sensing signals within a first specific time interval and establishing a first prediction model accordingly, then predicting a distribution status with respect to the at least one kind of characteristic on the sensing layer at a specific time point according to the first prediction model, and finally, determining whether to change the surface status of the sensing layer according to the distribution status.

9 Claims, 10 Drawing Sheets

FEEDBACK CONTROL METHOD AND DEVICE USING THE SAME

CROSS-REFERENCE TO RELATED APPLICATION

This non-provisional application claims priority under 35 U.S.C. §119(a) on Patent Application No(s). 099113809 filed in Taiwan, R.O.C. on Apr. 30, 2010, the entire contents of which are hereby incorporated by reference.

FIELD OF THE INVENTION

The present invention relates to a feedback control technique, particularly, to a feedback control method and the device based on certain sensing signals to establish a prediction model for a status of an object and thus performing a feedback control mechanism according to the predicted object's status.

BACKGROUND OF THE INVENTION

Individuals, who cannot avoid sitting in long periods of uninterrupted pressure over bony prominences and the consequent heat/moisture accumulation at such areas, including elderly individuals, persons who are neurologically impaired, and patients who are acutely hospitalized, are at increased risk for the development of pressure sore. These individuals cannot protect themselves from the pressure exerted on their body unless they consciously change position or have assistance in doing so. It is known that human body tissues are capable of withstanding enormous pressures and heat/moisture accumulation when brief in duration, but prolonged exposure to pressures may contribute to the progress of pressure sores. Thus, individuals who either consciously or unconsciously are incapable of altering their position to relieve pressure, including those having to maintain a setting position for a long period due to the nature of work, such as taxi/bus drivers, pilots, or even students and research personnel, are also at risk for the progress of pressure sore.

There are many studies about pressure relieving techniques for protecting those individuals from the risk of progressing pressure sores, one of which is disclosed in U.S. Pat. No. 7,549,707, which provides an automotive vehicle seating comfort system for providing heating, cooling, ventilation or a combination thereof to an individual in an automotive car seat and the system typically includes an insert, a blower and a tubular structure for providing fluid communication between the insert and blower for providing ventilation and/or cooling for the individual. Another study is disclosed in U.S. Pat. No. 7,331,184, which provides a hot-cold cushion capable of enabling an air circulation to be used for regulating the temperature of the cushion into a suitable range for human bodies. However, all those prior arts can only work mechanically without any knowledge about how the status of the cushion that is being used or any prediction relating to how the status of the cushion is going to be after being used for a specific period of time. Therefore, there is no feedback control mechanism being adapted for those prior-art techniques for adjusting the cushion in real-time manner and thus enhancing the performance of the same.

Therefore, it is in need of a feedback control method and device for overcoming the aforesaid shortcomings.

SUMMARY OF THE INVENTION

The object of the present invention is to provide a feedback control method and device using the same, in which the feedback control device can be divided into three parts, that is, a sensing layer having a sensor array distributed thereon that is formed as the surface of the feedback control device; a inflatable insert configured with a driving layer having a structure of mechanical array formed therein that is stuffed in the middle of the feedback control device; and a control unit, for analyzing sensing data from the sensing layer so as to generate a control signal accordingly. In order to prevent body tissues from being damaged by the exposure of a long period of uninterrupted pressure and its consequent heat/moisture accumulation, the feedback control method for the aforesaid feedback control device is designed to first perform a pressing status detection operation at a specific time interval using the sensing layer so as to establish a prediction model basing upon the sensing data generated thereby, and then predict a predicted sensing data that simulates the detection of the sensing layer at a specific time point in the future so as to be used as basis for controlling the driving layer to move accordingly and thus changing the surface geometry of the sensing layer for adapting the same to a predicted pressing status that is predicted to happen at the specific time point in the future anticipated by the prediction model.

Another object of the invention is to provide a feedback control method and device using the same, which utilize a characteristic that the effect of gravity can be transmitted from one part to another part when the two parts are in contact with each other, for designing its control unit to use an embedded mathematic model for performing an analysis upon an data array including a one-dimensional or multi-dimensional spatial-temporal series obtained from the detection of its sensing layer so as to establish a prediction model to be used for predicting any possible pressing status that may happen hereafter with respect to any possible negative event involving the usage of the feedback control device by a user. In addition, as the density distributions of characteristics including temperature, pressure and moisture can be acquired form the data array using the embedded mathematic model so that the information of spatial density indicating how the pressure and heat are distributed and concentrated as well as the information of temporal density indicating how the intensity of those characteristics are varied within a specific period of time, the control unit is able to conclude a spatial-temporal intensity profile relating to those characteristics and thus generate a control signal accordingly to be used for controlling the surface of the feedback control device where is engaged with the user to deform.

In an exemplary embodiment, the present invention provides a feedback control method, which comprises the steps of: providing a feedback control device while enabling the feedback control device to be configured with a sensing layer, for detecting and thus generating a plurality of sensing signals with respect to the at least one characteristics on the sensing layer, and a driving layer, for changing the surface status of the sensing layer; acquiring the plurality of sensing signals within a first specific time interval to be used for establishing a first prediction model accordingly; using the first prediction model to predict a distribution status with respect to the at least one characteristic on the sensing layer at a specific time point after the completing of the first specific time interval; and finally, determining whether to control the driving layer for changing the surface status of the sensing layer according to the distribution status.

In another exemplary embodiment, the present invention provides a feedback control device, which comprises: a sensing layer, having a plurality of sensors embedded therein to be used for detecting at least one characteristic so as to generate a plurality of sensing signals accordingly; a driving layer, disposed at a side of the sensing layer, for changing the surfaced status of the sensing layer; and a control unit, electrically coupled to the sensing layer and the driving layer, for establishing a first prediction model using the plural sensing signals obtained within a first specific time interval while using the established first prediction model to predict a distribution status with respect to the at least one characteristic on the sensing layer at a specific time point after the completing of the first specific time interval so as to be used in an evaluation for determining whether to control the driving layer for changing the surface status of the sensing layer according to the distribution status.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skills in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
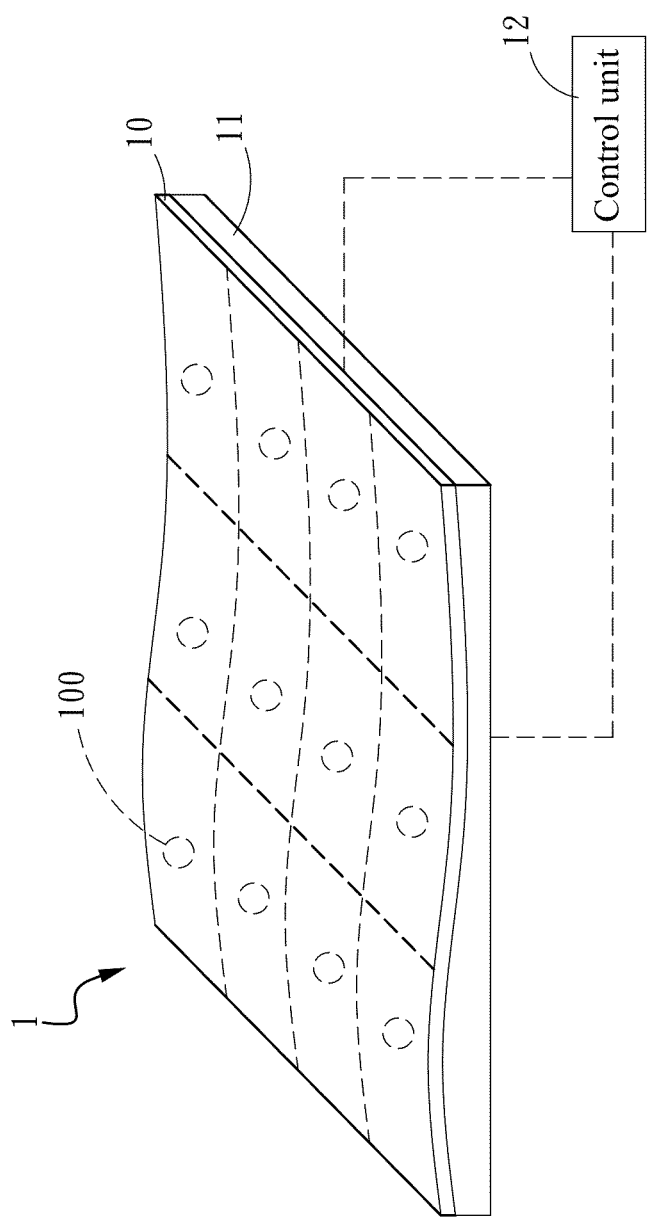
FIG. 1A is a schematic diagram showing a feedback control device according to an embodiment of the invention.

Please refer to FIG. 1A, which is a schematic diagram showing a feedback control device according to an embodiment of the invention. As shown in FIG. 1A, a feedback control device 1 is disclosed, which comprises a sensing layer 10, a driving layer 11 and a control unit 12, whereas the sensing layer is coupled to the control unit 12. In this embodiment, the sensing layer 10 has a plurality of sensors 100 embedded therein as a two-dimensional array, in which each sensor 100 is used for detecting at least one characteristic on the sensing layer 10 resulting from the sensing layer 10 when it is being compressed by a user as the user may be lying or sitting on the sensing layer 10, and thus generating sensing signals accordingly. It is noted that each sensor 100 can be a pressure sensor, a temperature sensor or a moisture sensor, but is not limited thereby. Consequently, the characteristic being detected thereby can be pressure, temperature or moisture, and also is not limited thereby.

Figure 2A:
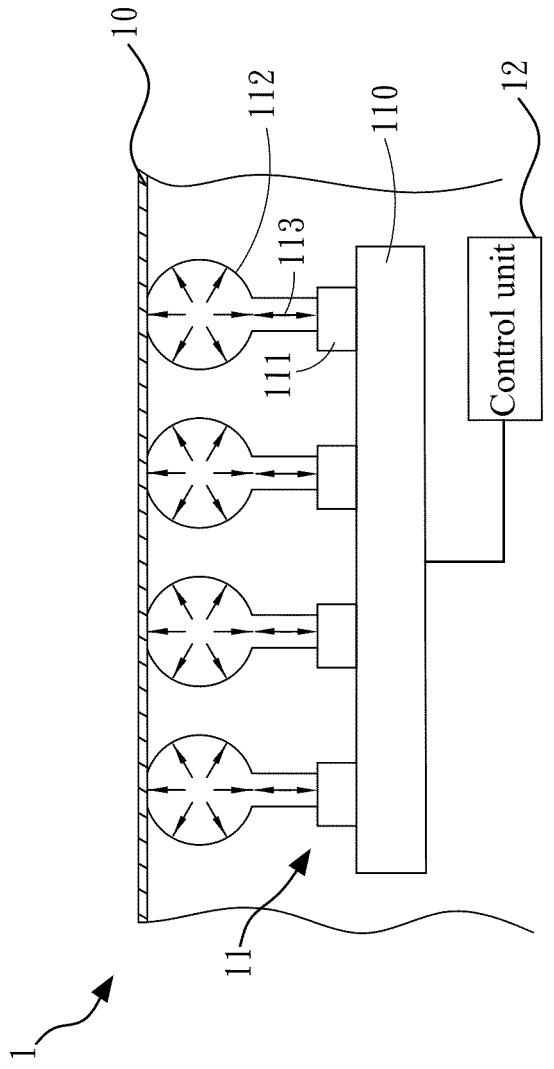
FIG. 2A is a schematic diagram showing a driving layer according to an embodiment of the invention.
Figure 2B:
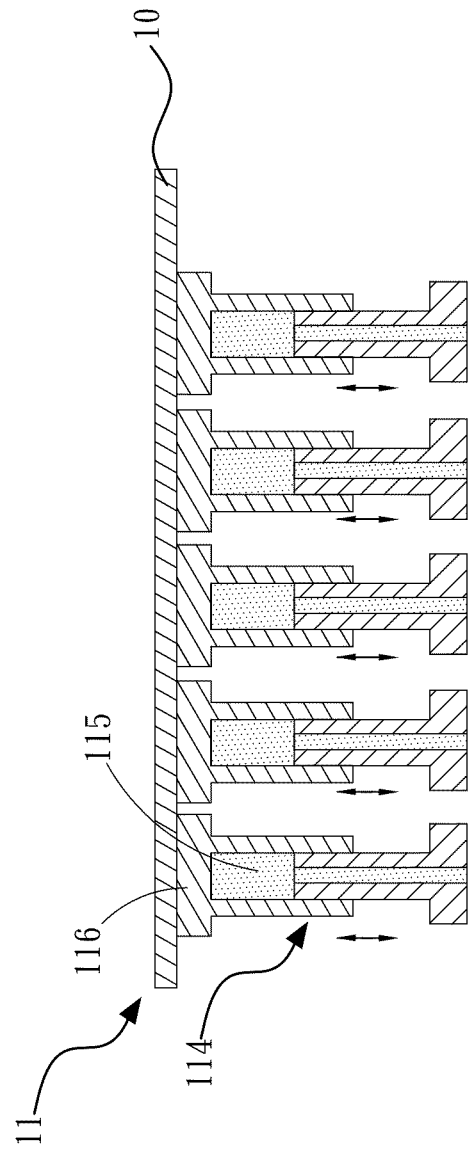
FIG. 2B is a schematic diagram showing a driving layer according to another embodiment of the invention.
Figure 2C:
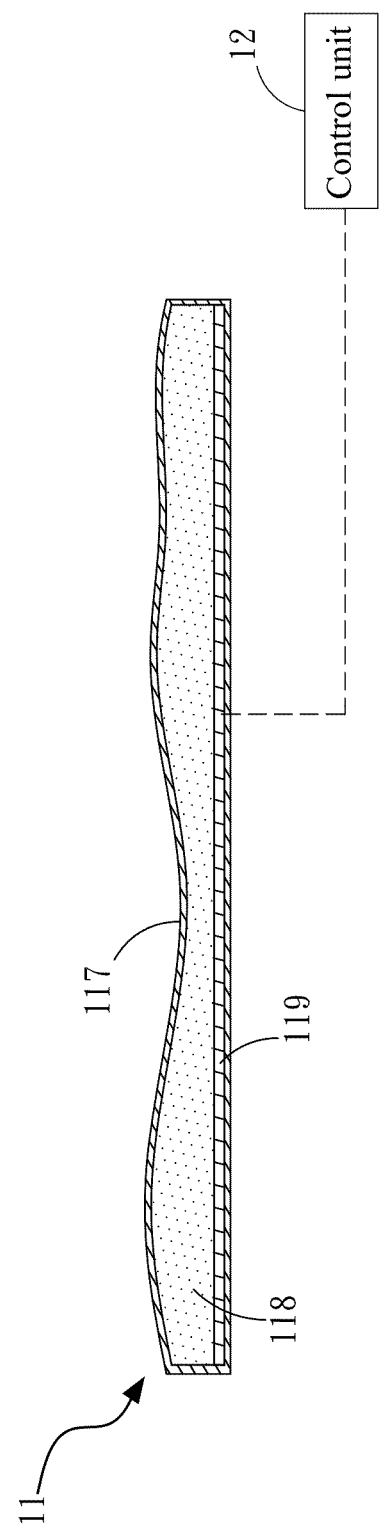
FIG. 2C is a schematic diagram showing a driving layer according to further another embodiment of the invention.

The driving layer 11 is disposed beneath the sensing layer 10 and is connected to the control unit 12, by that the driving layer 11 is able to receive control signals generated from the control unit 12 so as to change the surface status of the sensing layer 10. Please refer to FIG. 2A, which is a schematic diagram showing a driving layer according to an embodiment of the invention. In the embodiment shown in FIG. 2A, the driving layer is substantially an inflatable insert having a structure of mechanical array formed therein that is stuffed in the middle of the feedback control device and capable of being inflated or deflated for the inflow or outflow of a fluid 113. It is noted that the fluid 113 can be a liquid or gas. In FIG. 2A, the driving layer 11 is comprised of: a fluid pressure control element 110, at least one valve 111, at least one elastic member 112, in which by controlling the valve 111, the fluid pressure control element 110 is able to control the fluid 113 to flow in or out of the at least one elastic member and thus enable the at least one elastic member 112 to expand or contract. Thereby, as there can be a plurality of elastic members 112 being formed as an array in the driving layer 11 that can be controlled to expand or contract individually and respectively, the surface geometry of the sensing layer 10 can be changed accordingly. Please refer to FIG. 2B, which is a schematic diagram showing a driving layer according to another embodiment of the invention. In FIG. 2B, the driving layer is composed of an array of mechanical units 114, such as pneumatic cylinders or hydraulic cylinders. By controlling the fluid 115 to flow in or out each cylinder 114 for enabling the corresponding sleeve 116 to move upward or downward, the surface geometry of the sensing layer 10 is changed. Moreover, the surface geometry of the sensing layer 10 can be changed by controlling the characteristic of a portion of the material forming the driving layer 11 to change according to the stimulation of the control signal. For instance, by softening a portion of the driving layer 11, the portion of the sensing layer 10 corresponding to the soften portion will be depressed; or by hardening a portion of the driving layer 11, the portion of the sensing layer 10 corresponding to the soften portion will be raised; but is not limited thereby. Please refer to FIG. 2C, which is a schematic diagram showing a driving layer according to further another embodiment of the invention. In FIG. 2C, the driving layer 11 is formed as a bag-like structure 117 configured with an electrorheological (ER) fluid layer 118 and an electrode layer 119 in which the electrode layer 11, being composed of an array of electrodes, is electrically connected to the control unit 12. As shown in FIG. 2C, as the current or voltage exerted upon the electrode array can be changed by the control of the control unit 12, the electric field of the electrode array is changed according to the control of the control unit 12 and thus the apparent viscosity of these ER fluids filled inside the ER fluid layer 118 will change in response to the change of the electric field. It is noted that the bag-like structure 117 can be composed of a plurality of bags, each being filled with the ER fluid while being arranged in an array corresponding to the array of electrodes in the electrode layer 119.

Figure 1B:
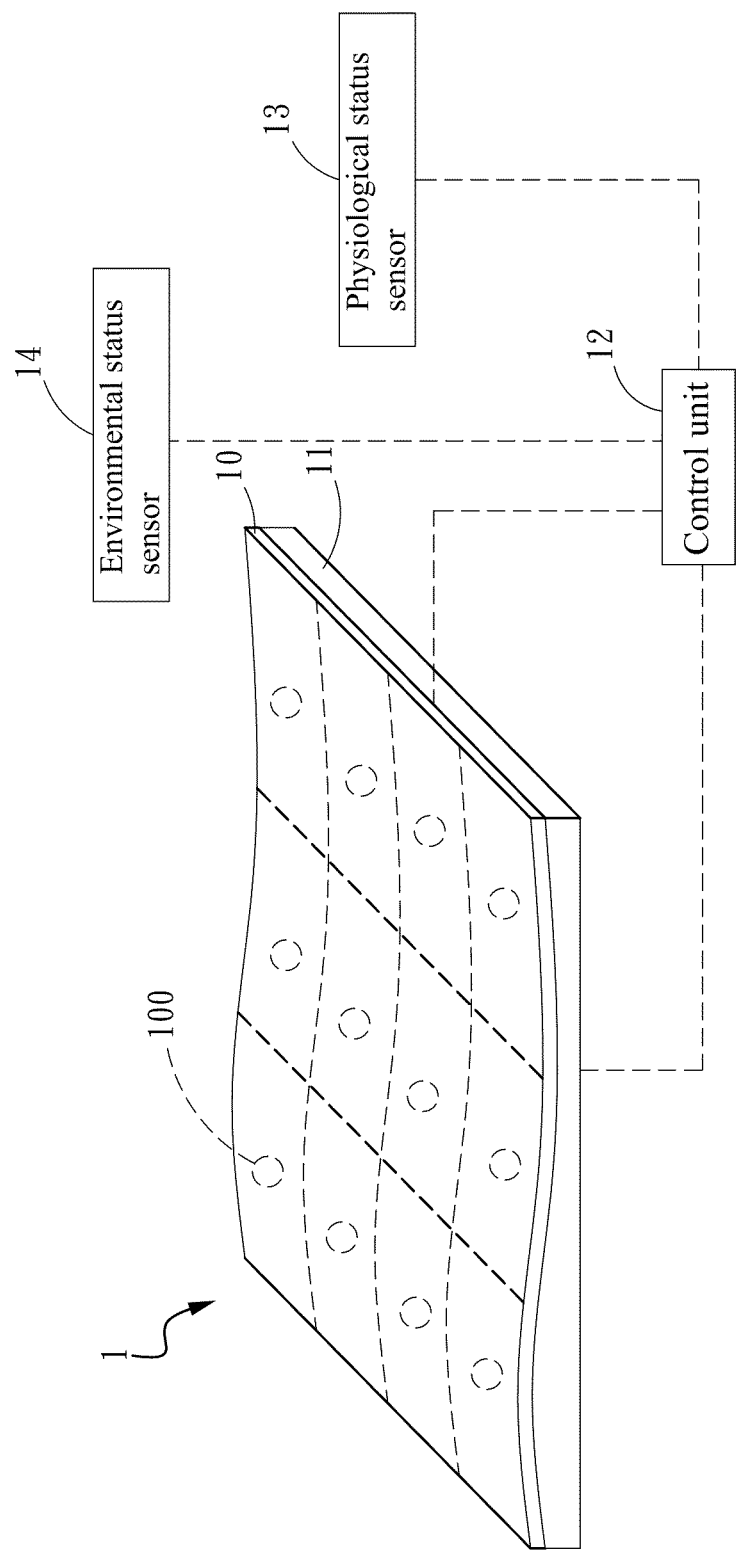
FIG. 1B is a schematic diagram showing a feedback control device according to another embodiment of the invention.

Back to FIG. 1A, as the control unit 12 is electrically connected to the sensing layer 10 and the driving layer 11, the control unit 10 is able to receive a plurality of sensing signals from the sensing layer 10 while feeding the same to a mathematical analysis model embedded in the control unit 10 so as to generate control signals corresponding to the sensing signals, that can be used by a feedback control algorithm also embedded in the control unit 12 for directing the driving layer 11 to change the surface status of the sensing layer 10. Please refer to FIG. 1B, which is a schematic diagram showing a feedback control device according to another embodiment of the invention. In the embodiment shown in FIG. 1B, the control unit 12 is further connected to a physiological status sensor 13 and an environmental status sensor 14. Wherein, the physiological status sensor 13 is used for detecting the physiological status of a user so as to generate a signal containing information relating to the physiological status of the user, which can be an electrocardiogram (ECG) sensor, heart beat/pulse sensor, or blood pressure sensor, but is not limited thereby. In addition, the environmental status sensor 14 is used for detecting the status of the environment ambient to the user, which can be a temperature sensor or a moisture sensor, but is not limited thereby. It is noted that although there are only physiological status sensor 13 and the environmental status sensor 14 being shown in the embodiment of FIG. 1B, there can be other types of sensors being used and connected to the control unit 12 of the invention if required so that the sensors capable of being adapted for the feedback control device of the present invention are not limited by the embodiment shown in FIG. 1B.

Figure 3B:
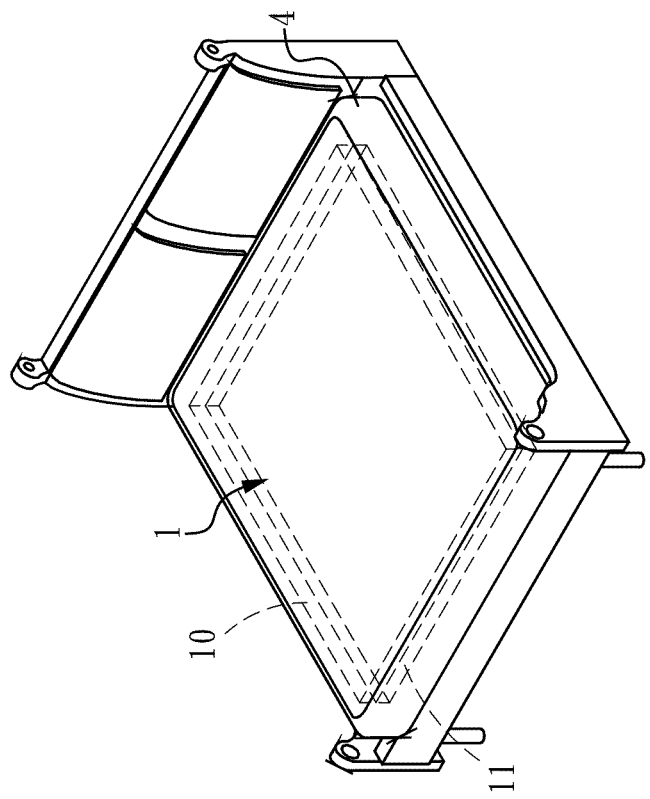
FIG. 3A and FIG. 3B are two schematic diagrams showing how the feedback control device of the invention can be arranged.
Figure 3A:
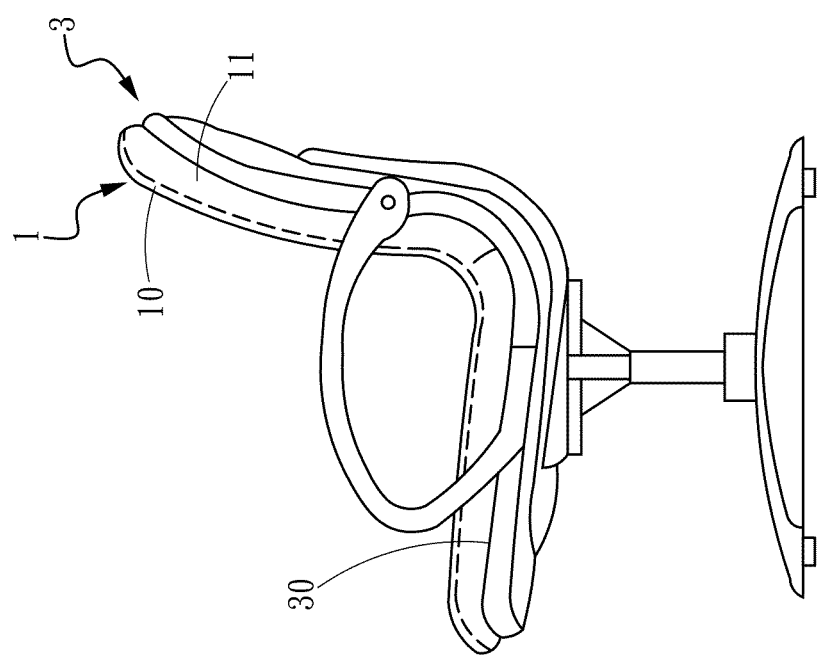

Please refer to FIG. 3A and FIG. 3B, which are two schematic diagrams showing how the feedback control device of the invention can be arranged. In FIG. 3A, the feedback control device 1 is disposed on a chair 3 at a position provided for a user to sit thereon. Moreover, as the sensing layer 10 is arranged as the top of the seat cushion that is in contact with the user when the user is sitting on the chair, it is able to generate sensing signals according to the surface status resulting from the user sitting thereon. In FIG. 3A, the driving layer 11 is arranged between the frame 30 of the chair 3 and the sensing layer 10. In FIG. 3B, the feedback control device 1 is disposed on a mattress 4 at a position that when a user is sitting or lying on the mattress 4, the pressing status including temperature, moisture and pressure distributions resulting from the sitting or lying can be detected by the feedback control device 1, and then being used thereby in a feedback control algorithm for controlling the feedback control device 1 to response to the detected press status so as to prevent body tissues of the user from being damaged by long periods of uninterrupted pressure and the consequent heat/moisture accumulation.

Figure 4:
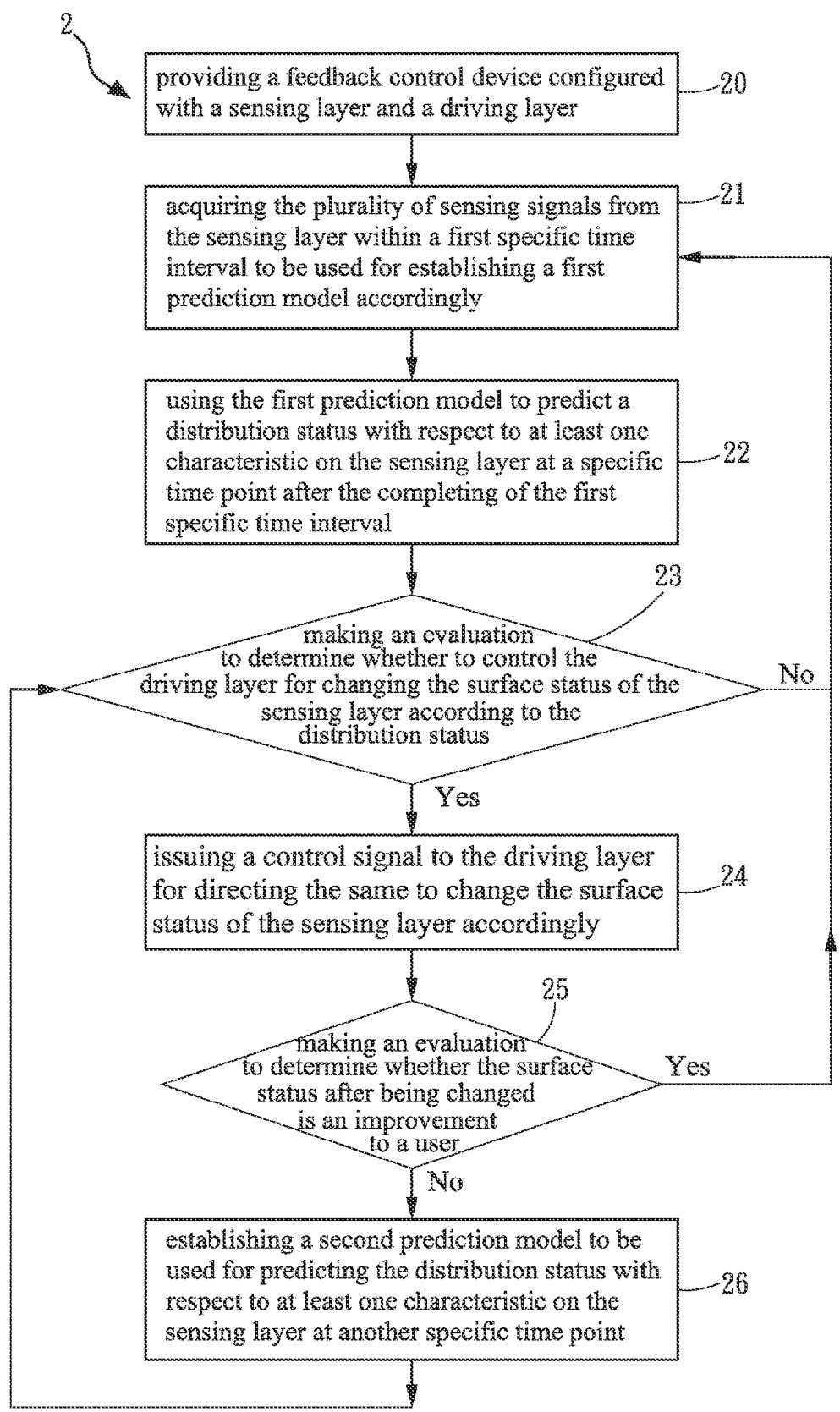
FIG. 4 is a flow chart depicting the steps of a feedback control method of the invention.

Please refer to FIG. 4, which is a flow chart depicting the steps of a feedback control method of the invention. The feedback control method 2 of FIG. 4 starts from step 20. At step 20, a feedback control device is provided; and then the flow proceeds to step 21. It is noted that the feedback control device provided in step 20 is structure the same as those disclosed in FIG. 1A or FIG. 1B, and thus will not be described further herein. At step 21, a plurality of sensing signals is acquired from the sensing layer within a first specific time interval to be used for establishing a first prediction model accordingly; and then the flow proceeds to step 22. Taking the mattress 4 shown in FIG. 3B for instance, when a user is lying on the mattress 4, the sensing layer 10 configured in the mattress 4 will detects characteristics resulting from the user lying on the mattress 4, whereas the characteristics can includes the measurements of the temperature, pressure and moisture on the sensing layer 10. Moreover, the first specific time interval can be designated as 20 minutes, but is not limited thereby; and within that period of 20 minutes, a measurement will be performed by the sensing layer 10 once per unit of time, e.g. at every other second, so as to generate one sensing signal corresponding to the measured characteristics. Thus, there can be 1200 sensing signals being generated and received by the control unit 12 after 20 minutes. Thereafter, the control unit will feed those sensing signals into a mathematical analysis model embedded therein for establishing the first prediction model, in which the mathematical analysis model can be an algorithm of partial regularized least squares (PRLS). In this embodiment, a two-dimensional PRLS is used, which is known to those skills in the art and thus is not described further herein.

The first prediction model established according to the aforesaid mathematical analysis model can be represented as a mathematical function. For instance, by taking temperature, pressure and moisture as variables while those characteristics all are time function, the first prediction model can be represents as following:

$$f(p,h,T)_0 = f(t) \qquad (1)$$

wherein, t represents time;
p represents pressure;
h represents moisture; and
T represents temperature.

Figure 5:
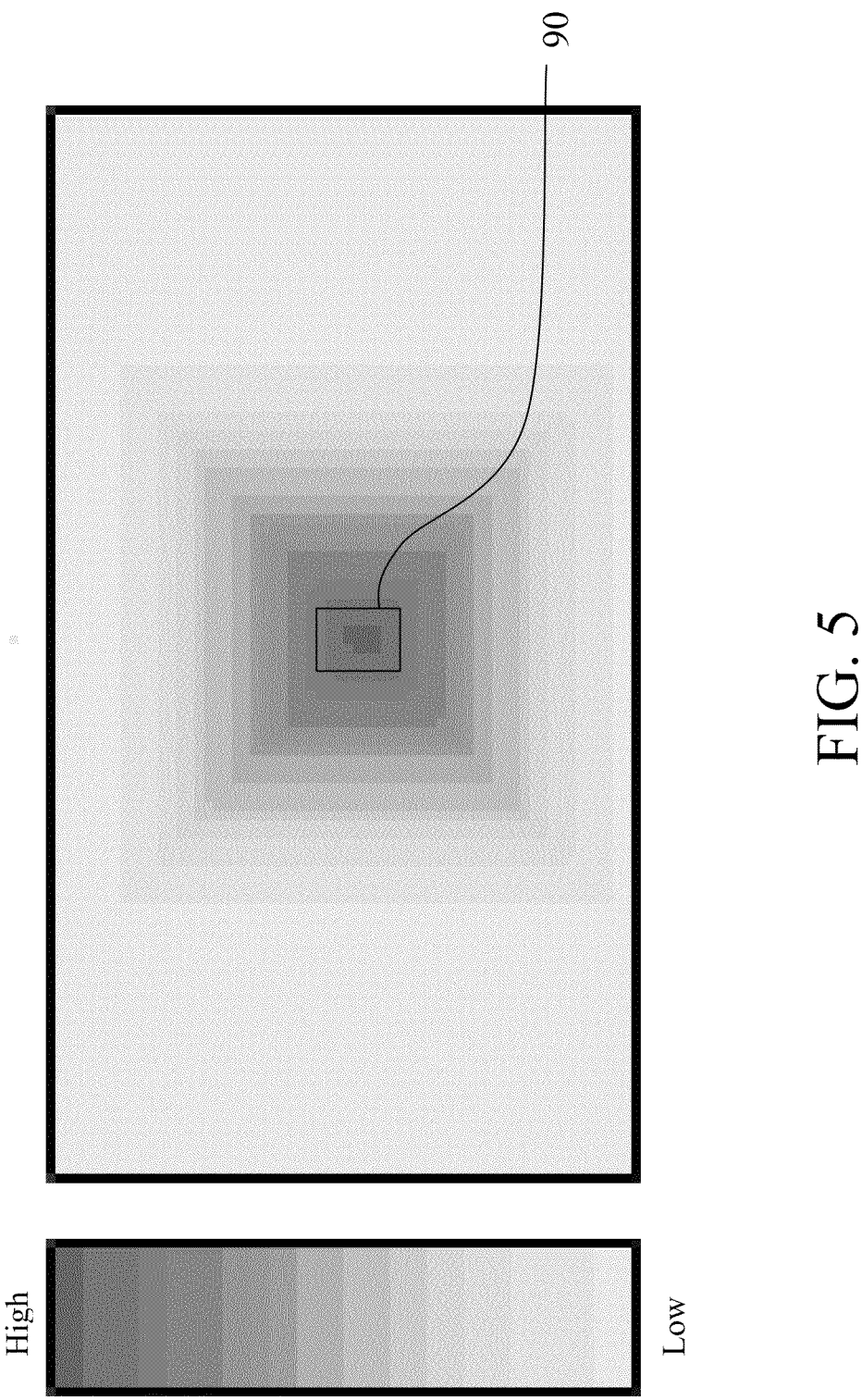
FIG. 5 shows an intensity distribution of a characteristic that is detected by the feedback control device of the invention.

The first prediction model is established corresponding to the aforesaid 1200 sensing signals, and after the first prediction model is established, the flow proceeds to step 22. At step 22, the first prediction model, i.e., $$f(p,h,T)_0 = f(t)$$

is used to predict a distribution status with respect to the at least one characteristic on the sensing layer at a specific time point, i.e. $t_1$, after the completing of the first specific time interval; and then the flow proceeds to step 23. In this embodiment, as there are three characteristics being detected, that is, temperature, pressure and moisture, the distribution of temperature, pressure and moisture will be established at step 22 which can be represented as an image shown in FIG. 5, or can be represented as the distribution of data points in a 2D Cartesian coordinate system. Moreover, although the image representing the established characteristic distribution shown in FIG. 5 is a planar image, it can be converted into a 3D image.

After the step 22 is completed, the flow proceeds to step 23. At step 23, an evaluation is performed for determining whether to control the driving layer for changing the surface status of the sensing layer according to the distribution status; if so, the flow proceeds to step 24; otherwise, the flow proceeds back to step 21. During the performing of the step 23, the evaluation is executed basing upon a feedback control mechanism that can determine whether the user is sitting or lying comfortably on the feedback control device or is subjected to a situation that his/her body tissue may be damaged. Therefore, if the operation of the step 22 predicts that temperature, pressure and moisture are all evenly distributed without detecting any abnormality, the control unit will not issue the control signal to the driving layer for changing the surface status of the sensing layer, i.e. the surface status of the sensing layer remains unchanged, while directing the flow to proceeds back to step 21.

On the other hand, if the control unit detects that there are abnormalities happening at some areas in the sensing layer, such as the temperature values, the pressure values or the moisture values detected and distributed in the areas are higher than a threshold value, the flow will proceeds to step 24. At step 24, the control unit will issue a control signal to the driving layer for directing the same to change the surface status of the sensing layer; and then the flow proceeds to step 25. In addition, in an other embodiment of the present invention, the control unit can be connected to a physiological status sensor and an environmental status sensor, by that the vital signs of a user, such as heart beat, blood pressure and pulse, can be measured as well as the environmental information relating to the environment ambient to the user, such as room temperature and moisture, can also be measured. Thus, in addition to the characteristic of the sensing layer, the control unit also receives such physiological and environmental information to be used in the aforesaid prediction so that the control signal generated solely according to the analysis basing upon the detected characteristic of the sensing layer is calibrated and adjusted according to the physiology of the user as well as the ambient environment.

Figure 6A:
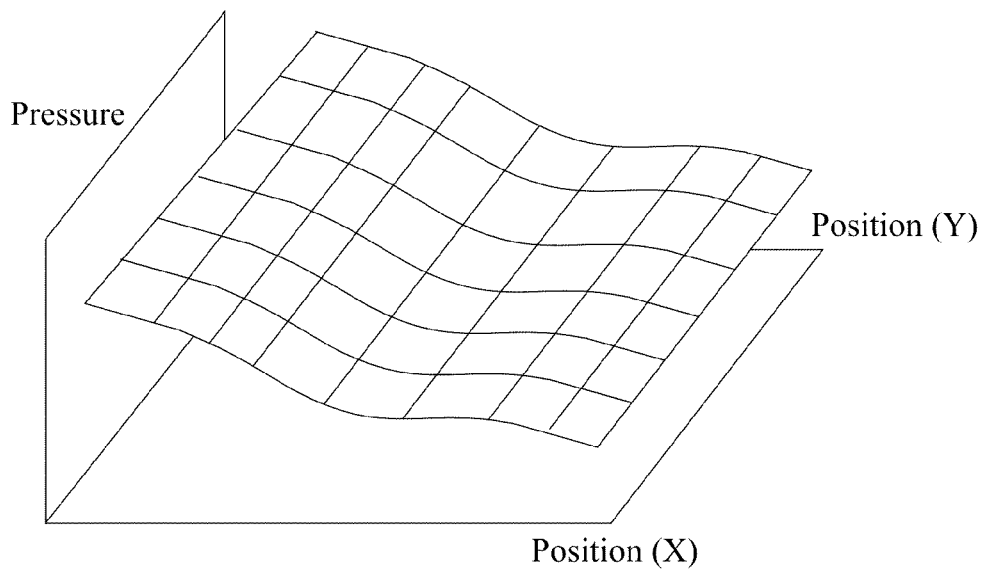
FIG. 6A and FIG. 6B show two curved surfaces that are curved opposite to each other.
Figure 6B:
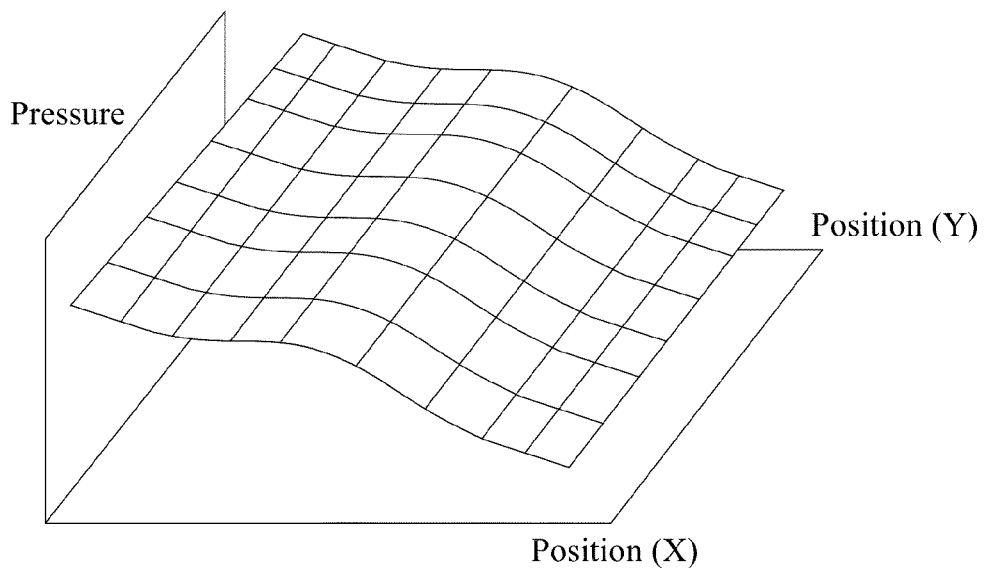

The control unit is capable of using a surface analysis model to establish a curved surface that is curved opposite to the surface status of the sensing layer predicted by the prediction model and before being changed by the driving layer, and then sending a corresponding control signal to the driving layer. Please refer to FIGS. 6A and 6B, which show two curved surfaces that are curved opposite to each other. In FIG. 6A, the curve of the sensing layer is resulting from a user lying or sitting on the sensing layer as the middle of the sensing layer is compressed more than other areas. Thus, the control unit will issue a control signal to the driving layer for directing the fluidic/mechanical mechanism embedded therein to move accordingly and thus changing the surface geometry of the sensing layer in a manner that the surface status after being changed by the driving layer enables the surface of the sensing layer to be shaped into a curved surface that is curved opposite to that before being changed, as shown in FIG. 6B. Moreover in another embodiment, after the curved surface that is curved opposite to that before being changed is established and after the intensity distribution of the at least one characteristic relating to sensing layer defined by the changed surface status is achieved, the control unit further direct the driving layer to modify the curved surface defined by the changed surface status according to an analysis resulting from an unevenly averaging mechanical model or an evenly averaging mechanical model. That is, after considering the weight distribution of the user, the curved surface that may have acute curvature changes is flattened for relaxing the tightness and the compression on the sensing layer. Moreover, the analysis of the evenly averaging mechanical model is performed as averaging the characteristic distribution; and the analysis of the unevenly averaging mechanical model is performed as applying a weighted averaging on the characteristic distribution, or by applying a transfer function on the characteristic distribution.

Figure 7:
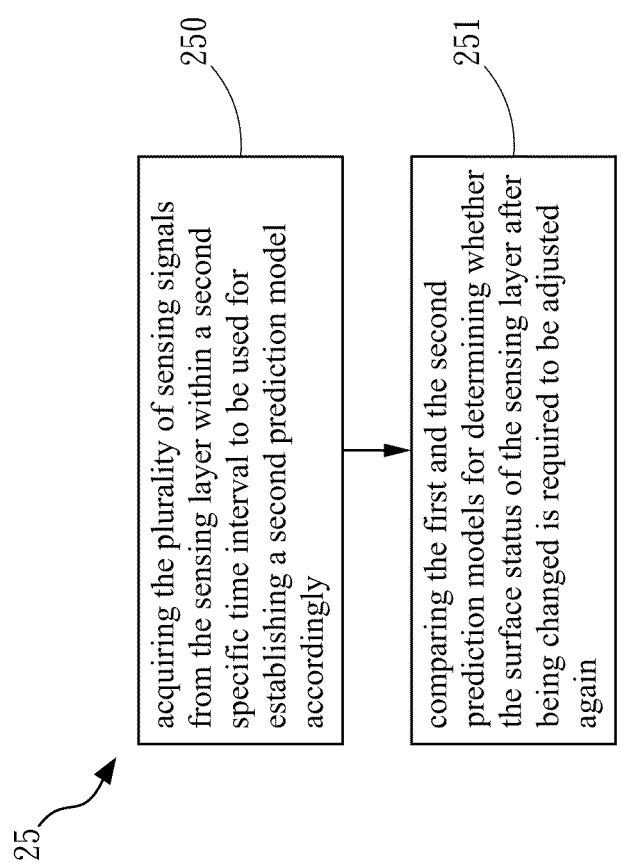
FIG. 7 is a flow chart depicting the step for determining whether the surface status after being changed is an improvement to a user.

After the completion of the step 24, the step 25 is performed for determining whether the surface status after being changed is an improvement to a user; if so, the flow proceeds to step 21; otherwise, the flow proceeds to step 26. Please refer to FIG. 7, which is a flow chart depicting the step for determining whether the surface status after being changed is an improvement to a user. The operation of step 25 further comprises two steps 251 and 252, and starts from the step 251. At step 251, a plurality of sensing signals is acquired from the sensing layer within a second specific time interval to be used for establishing a second prediction model accordingly; and then the flow proceeds to step 251. As the surface geometry of the sensing layer had already been changed during the step 24 before the starting of the step 250, the purpose of the step 250 is to establish another prediction model, i.e. the second prediction model, using the sensing signals acquired during another time interval other then the first time interval. However, since the final goal for performing the step 25 is to determine whether the surface status after being changed in step 24 is an improvement to a user, the second time interval should be shorter than the first time interval. For instance, if the duration of the first time interval is 20 minutes, the second time interval should be about 5 or 10 minutes. It is noted that the durations of those time interval are determined according to actual requirement, and are not limited by the aforesaid embodiments.

If a period of 5 minutes is defined as the second time interval and a measurement will be performed by the sensing layer 10 once per unit of time, e.g. at every other second, there will be 300 sensing signals being acquired and arranged in a time series that is send to the control unit. Therefore, the control unit will establish the second prediction model according to the time series of the 300 sensing signals. Similarly, the second prediction model is an algorithm of partial regularized least squares (PRLS). In this embodiment, a two-dimensional PRLS is used and can be represents as following:

$$f(p,h,T)_1 = f(t) \tag{2}$$

After the completion of the step 250, the flow proceeds to step 251 for comparing the first prediction model, i.e. $f(p,h,T)_0 = f(t)$, and the second prediction model, i.e. $f(p,h,T)_1 = f(t)$, so as to determine whether the surface status of the sensing layer after being changed is required to be adjusted again. Since both the first prediction model and the second prediction model are time-related functions, the comparison of the two can be used for determining whether the surface status after being changed in step 24 is an improvement to a user. Moreover, as the comparison of the prediction models is a technique known to those skills in the art, it is not described further herein. However, as the improvement is apparent and can be determined based upon the pressure variation, which can be assisted by the temperature and moisture variations. Taking a determination basing upon pressure variation for example, if the area where there was subject to a large pressure before the surface change is released from such pressure concentration after surface change, the improvement is confirmed; otherwise, if not released or even worsened, the improvement is not achieved. In addition, in another embodiment of the invention, the control unit can perform the improvement analysis combining the detected physiological signals of the user as well as the ambient environmental signals. As shown in FIG. 4, if the improvement is confirmed, the flow proceeds back to step 21; otherwise, the flow proceeds to step 26 for establishing a second prediction model to be used for predicting the distribution status with respect to at least one characteristic on the sensing layer at another specific time point. After the completion of step 26, the flow will proceed back to step 23 for restarting the feedback control operation until an improvement is achieved.

With respect to the above description then, it is to be realized that the optimum dimensional relationships for the parts of the invention, to include variations in size, materials, shape, form, function and manner of operation, assembly and use, are deemed readily apparent and obvious to one skill in the art, and all equivalent relationships to those illustrated in the drawings and described in the specification are intended to be encompassed by the present invention.

What is claimed is:

1. A feedback control method, comprising the steps of:
   providing a feedback control device, the feedback control device is able to be configured with a sensing layer, which detects and gathers the external information and generates a plurality of sensing signals with respect to at least one characteristic on the sensing layer, and the device is able to control a driving layer, which is able to change the surface status of the sensing layer;

acquiring the plurality of sensing signals within a first specific time interval to be used for establishing a first prediction model accordingly;

using the first prediction model to predict a distribution status with respect to the at least one characteristic on the sensing layer at a specific time point after the completing of the first specific time interval; and determining whether to control the driving layer for changing the surface status of the sensing layer according to the distribution status, wherein the surface status after being changed by the driving layer enables the surface of the sensing layer to be shaped into a curved surface that is curved opposite to that before being changed, while enabling the intensity distribution of the at least one characteristic relating to the changed surface status to compensate the intensity distribution of the at least one characteristic relating to the surface status before being changed; and wherein after the intensity distribution of the at least one characteristic relating to sensing layer defined by the changed surface status is achieved, the curved surface defined by the changed surface status is further being modified by the use of one model selected from the group consisting of: an evenly averaging mechanical model and an unevenly averaging mechanical model.

2. The feedback control method of claim 1, after the step for changing of the surface status of the sensing layer according to the distribution status, further comprising the steps of:

acquiring the plurality of sensing signals from the sensing layer within a second specific time interval to be used for establishing a second prediction model accordingly; and comparing the first and the second prediction models for determining whether the surface status of the sensing layer after being changed is required to be adjusted again.

3. The feedback control method of claim 2, wherein each of the first prediction model and the second prediction model is established using a partial regularized least squares (PRLS) means.

4. The feedback control method of claim 1, wherein the at least one characteristic is selected from the group consisting of: pressure, temperature, and moisture.

5. A feedback control device, comprising:

a sensing layer, having a plurality of sensors embedded therein to be used for detecting at least one characteristic so as to generate a plurality of sensing signals accordingly;

a driving layer, disposed at a side of the sensing layer, for changing the surfaced status of the sensing layer; and a control unit, electrically coupled to the sensing layer and the driving layer, for establishing a first prediction model using the plural sensing signals obtained within a first specific time interval while using the established first prediction model to predict a distribution status with respect to the at least one characteristic on the sensing layer at a specific time point after the completing of the first specific time interval so as to be used in an evaluation for determining whether to control the driving layer for changing the surface status of the sensing layer according to the distribution status, wherein the surface status after being changed by the driving layer according to the controlling of the control unit enables the surface of the sensing layer to be shaped into a curved surface that is curved opposite to that before being changed while enabling the intensity distribution of the at least one characteristic relating to the changed surface status to compensate the intensity distribution of the at least one characteristic relating to the surface status before being changed; and wherein after the intensity distribution of the at least one characteristic relating to sensing layer defined by the changed surface status is achieved, the control unit further direct the driving layer to modify the curved surface defined by the changed surface status according to an analysis resulting from an unevenly averaging mechanical model.

6. The feedback control device of claim 5, wherein the control unit is further capable of acquiring the plurality of sensing signals from the sensing layer within a second specific time interval to be used for establishing a second prediction model accordingly, while comparing the first and the second prediction models for determining whether the surface status of the sensing layer after being changed is required to be adjusted again.

7. The feedback control device of claim 6, wherein each of the first prediction model and the second prediction model is established using a partial regularized least squares (PRLS) means.

8. The feedback control device of claim 5, wherein the at least one characteristic is selected from the group consisting of: pressure, temperature, and moisture.

9. The feedback control device of claim 5, wherein the control unit is further coupled to a physiological status sensor or an environmental status sensor.

* * * * *